United States Patent [19]

Czyszczewski et al.

[11] Patent Number: 4,462,701
[45] Date of Patent: Jul. 31, 1984

[54] PRINTING SYSTEM WHEREIN JUSTIFICATION DETERMINATION IS SHARED BETWEEN A HOST PROCESSOR AND A PRINTER

[75] Inventors: Joseph S. Czyszczewski, Round Rock; Robert A. Pascoe; James M. Stafford, both of Austin, all of Tex.

[73] Assignee: International Business Machines Corporation, Armonk, N.Y.

[21] Appl. No.: 377,101

[22] Filed: May 11, 1982

[51] Int. Cl.³ .............................................. B41J 5/30
[52] U.S. Cl. ........................................ 400/3; 400/64; 400/70; 364/900
[58] Field of Search ................. 400/2, 3, 4, 5, 6, 7, 400/9, 10, 12, 13, 64, 70, 76; 364/900

[56] References Cited

U.S. PATENT DOCUMENTS

| | | | |
|---|---|---|---|
| 2,762,485 | 9/1956 | Bafour et al. | 400/6 X |
| 2,934,145 | 4/1960 | Blodgett | 400/4 X |
| 3,312,953 | 4/1967 | Wang et al. | 400/2 X |
| 3,386,552 | 6/1968 | Lorber et al. | 400/7 |
| 3,483,527 | 12/1969 | Terry | 400/5 X |
| 3,915,278 | 10/1975 | Spence et al. | 400/64 |
| 4,085,447 | 4/1978 | Pertl et al. | 364/900 |
| 4,218,754 | 8/1980 | Schaeffer | 364/900 |
| 4,261,039 | 4/1981 | Baker et al. | 400/70 X |
| 4,298,290 | 11/1981 | Barnes et al. | 400/12 X |

Primary Examiner—Ernest T. Wright, Jr.
Attorney, Agent, or Firm—J. B. Kraft

[57] ABSTRACT

In a printing system comprising a printer controlled by a host processor (11), a system of justification is provided wherein the determination of justification parameters is shared by the host processor (11) and the printer formatting processor (12). Justification means (25) in the host processor (11) determine which spaces in a line are to be altered to effect justification. Means (26, 28 and 13) are provided for conveying data from the host processor to the printer indicating which spaces in a particular line are to be so altered, and means (42) are provided in the printer for determining the size of the indicated spaces necessary to effect such a justification.

8 Claims, 5 Drawing Figures

3
PRINTING SYSTEM WHEREIN JUSTIFICATION DETERMINATION IS SHARED BETWEEN A HOST PROCESSOR AND A PRINTER

DESCRIPTION

TECHNICAL FIELD

The present invention relates primarily to text processing systems, i.e., information processing systems wherein the processing affects the format of the information. More particularly, it relates to justification. The invention provides the text processing function of justification in a data processing system printer.

BACKGROUND ART

In prior art information processing systems, there has traditionally been a dividing line between data processing systems and text or word processing systems. The older data processing field developed over the past forty years is directed to information processing the primary purpose of which is to affect the value of the information being processed. The processing involves mathematical and other computational operations such as ordering and sorting which affect the substance or value of the information. In general, data processing is not concerned with format of the information except to the extent necessary to make the information readable or discernible to the operator either through a display or a printout. Otherwise, form is of no consequence.

On the other hand, in the newer word processing or text processing field which has developed over the past ten years, the value or substance of the information is of little consequence. Text or word processing is concerned with the formatting of alphanumeric data into a format or arrangement suitable for specified printed documents which are to be read and discerned by the public, e.g., letters, textbooks, magazines and newspapers.

Because of these substantial differences in functions, text processing equipment has been in general developed and marketed independent of data processing technology. Most businesses which require both data processing and text processing are likely to have independent systems for each function.

In recent years there has been an increasing demand for data processing equipment having at least some text processing capability so that the data processing equipment is capable of producing letter quality information documents in report form or even correspondence. To this end, there has been a trend in the industry to endow data processing systems with at least some word processing functions such as justification. Automated justification which is extensively available in the word processing industry, involves the uniform arrangement of interword spaces on each line so that the spaces are even and that the several lines on a page each end up at approximately the same position.

In traditional word processing systems involving the host processor, a relatively remote printer and a communications channel between the host processor and the printer, the determinations involved in the justification function are usually carried out either entirely within the host processor and transmitted to a printer with virtually no justification determining capability or justification determination is carried out entirely at the printer in a processor which is a microprocessor associated with the printer. In this latter case, the host processor would transmit to the printer over the communications channel only the characters on a particular line grouped as words, and the microprocessor at the printer would do the entire justification determination.

Initially in the word processing industry, justification determination involved distribution of blank space on a line into interword spacing in increments of full character spaces. However, as demands for higher quality formatted printing increased, the distribution of interword space was refined down to the use of increments which were a fraction of a full character space, e.g., 1/10ths of character spaces.

Justification with such fraction of character space increments could be carried out by word processing justification routines on the microprocessor associated with the printer. In addition, word processing equipment had the capability of carrying the entire justification function at the host processor and then transmitting over the communication channel the final character spacing in printer positions which were spaced in increments or of fractions of full character spaces.

In contrast to the performance of the justification in word processing system wherein the entire function is carried out at the host processor level or at the printer level, we have surprisingly found that in adapting the justification function to a data processing printing system, the most effective results are achieved when the justification function is shared between the host processor and the processor associated with the printer. The bulk of communications between a host data processor and a printer would involve data processing information only requiring transmission at full character spacing. Consequently, there would be a substantial amount of inefficiency in setting up a more costly and time consuming communication system capable of transmitting in increments of fractions of full character spacing when such space fractions would only be needed during the limited time the communications would involve the justification function. Thus, carrying out the entire justification function on the host processor would certainly not be too efficient.

On the other hand, if the entire justification function were carried out in the processor associated with the printer, data processing resources already available within the host processor would not be effectively utilized.

DISCLOSURE OF THE INVENTION

Thus, the present invention provides for the sharing of the justification function between the host processor and the printer in the following manner. Justification means are provided in the processor for determining which spaces in a line are to be altered to effect justification. Then, means are provided for conveying or transmitting data from the processor to the printer indicating which spaces in a line are to be altered; with this approach, this conveyed data may be in the full character increments conventionally used in communications from data processors. Further, processing means are provided in the printer for then determining the size of the spaces in order to effect justification. This latter means may of course operate in increments involving fractions of spaces since this data will not be further communicated.

BRIEF DESCRIPTION OF DRAWING

Referring now to the drawing, wherein a preferred embodiment of the invention is illustrated, and wherein like reference numerals are used throughout to designate like parts.

BEST MODE FOR CARRYING OUT THE INVENTION

Figure 1:
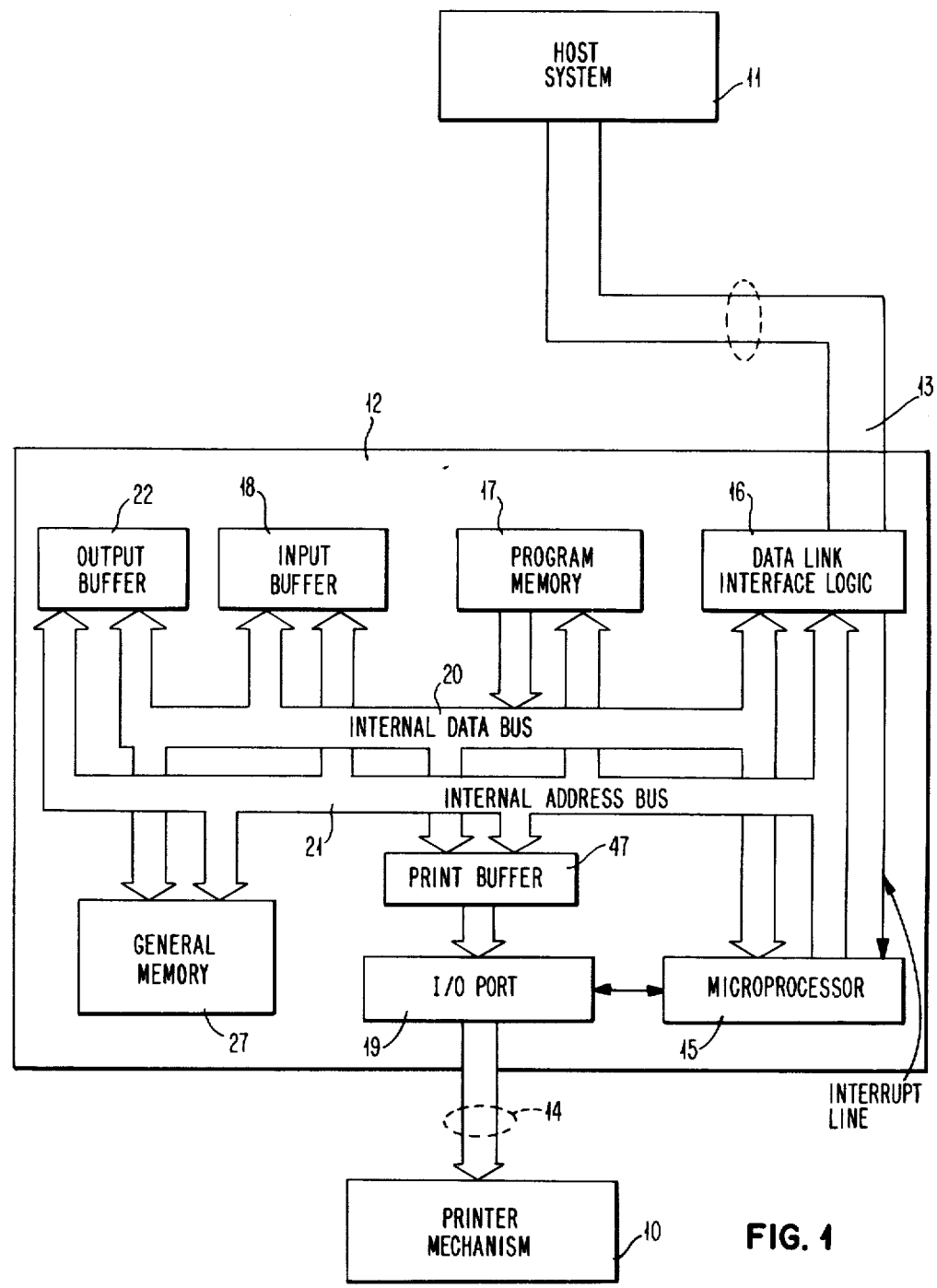
FIG. 1 is a diagrammatic representation of the logic and apparatus which may be used to carry out the justification expedients of the present invention.

The logic and apparatus for carrying out the present invention is shown in FIG. 1. The system comprises a printer mechanism 10 which may be any conventional printer apparatus conventionally used in connection with word or text processing systems to provide letter quality documents. The host system 11 may be any standard data processing or word processing system, preferably one having a keyboard entry display; a typical system which may be used is the IBM System 23 data processor or the IBM 5280 data entry system. Alternatively, a text processor may be used for the host e.g., the system described in co-pending application Ser. No. 273,561, filed June 16, 1981, R. E. Berry et al, now U.S. Pat. No. 4,417,322, issued Nov. 22, 1983, assigned to the assignee of the present invention.

The printer mechanism 10 used in the present invention has some formatting capability. This formatting is carried out in formatting unit 12 associated with the printer mechanism 10. The formatting unit 12 is used to carry out such simple document formatting functions including justification. The host system 11 communicates with the formatting unit 12 over cable 13. The data transmitted over cable 13 to formatting unit 12 represents character data to be printed on printer mechanism 10 as a document in which data is already substantially formatted. The formatting unit 12 will perform its additional formatting functions and transmit the final formatted information to the printer mechanism 10 over bus 14. This information will be utilized to control the printer mechanism 10 to produce the final "hard copy" document on printer mechanism 10 in the conventional manner.

Formatting unit 12 contains a microprocessor 15 controlling all of the operations carried out within formatting unit 12. The formatting unit 12 further contains data link interface logic 16 which serves as the interface between the host system 11 and the formatting unit 12. Program memory unit 17 includes the operational programs utilized by microprocessor 15 in carrying out the various formatting functions within unit 12. Input buffer 18 provides for the storage of all of the data provided by host system 11. Output buffer 22 stores format data including justification parameters developed by the formatting unit 12 which will eventually be communicated to control the printer mechanism 10. Internal address bus 20 connects the various logic units within formatting unit 12 while internal address bus 21 serves in the conventional manner as means for addressing the various logic units which are to be interconnected through internal address bus 21. The data in final form to control the printer mechanism 10 is stored in print buffer 47 from which it is transferred to the printer mechanism 10 through I/O port unit 19, which operates in a conventional manner to serve as the interface between print buffer 47 and the printer mechanism 10 to provide formatted data necessary to operate the printer mechanism 10 over bus 14.

Figure 2:
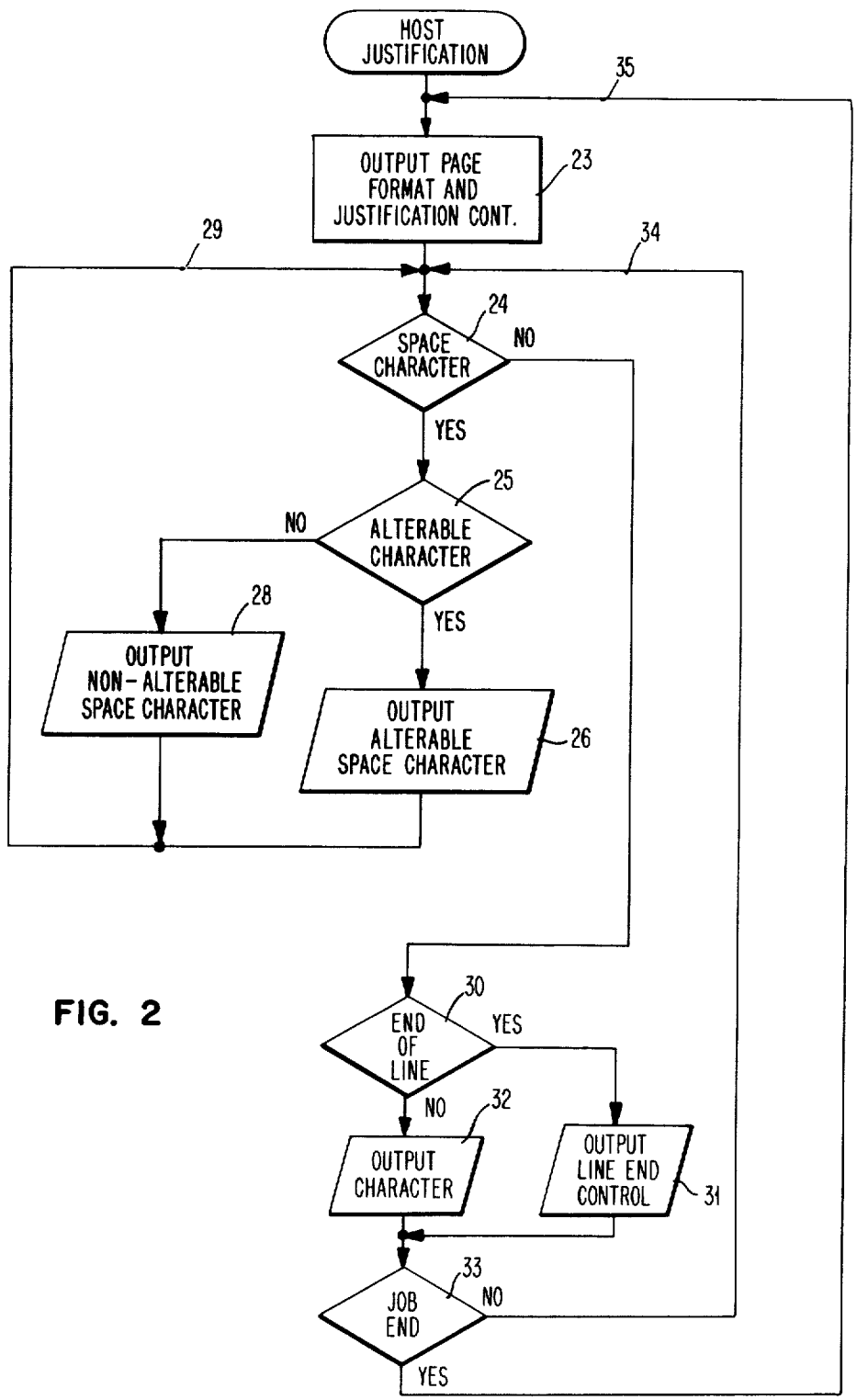
FIG. 2 is a flow chart of the process wherein the host processor makes the determination as to which spaces are to be altered to effect justification.

Now, using the logic and apparatus described above with respect to FIG. 1, the operations involved in the present invention will be described with respect to the flow charts in FIGS. 2, 3 and 4. In the following description, it should be understood that the only formatting expedient to be fully described will be the expedient involving justification. Now, with respect to FIG. 2, we will describe the data processing which takes place in the host system 11. In the first step in the host justification routine, block 23, the host system 11 transmits over cable 13 to the formatting unit 12, the various page format and justification controls which are to be used by formatting unit 12 to produce the ultimate page format. This of course includes the various parameters which will be subsequently used by the formatting unit 12 to determine the size of the interword spacing when carrying out that portion of the justification function to be performed in the formatting unit 12. This will be subsequently described with respect to FIG. 3. In any event, the data input regarding page format and justification is processed through the data link interface logic 16 and forwarded over internal data bus 20 to the program memory unit 17 wherein the page format and justification parameters are stored.

When this step is completed, the host system 11 commences its justification function. In this function it considers the data stream character by character in sequence as follows. First, block 24, a decision is made as to whether the next character is a space character. If this character is a space character, then a determination is made, block 25, as to whether or not this space character is an alterable character. Conventionally in justification, it is predetermined as to what types of characters should be alterable and what types should not. Some examples of space characters which conventionally are not alterable are leading space characters, spaces which occur to the left of a tab, spaces which occur in the last line of a paragraph, and spaces which occur in a title or heading. The listings of the types of space characters which are not alterable is stored in a listing in the host system 11 which then determines with respect to each space character whether or not the particular character is of a type on the non-alterable list.

If it is determined that the character is an alterable character, then, block 26, an indication that we have another alterable space character is output from the host system 11 to formatting unit 12 which stores the character as an alterable character in input buffer 18 which is a recirculated serial buffer. If a determination is made in block 25 that the next character is not an alterable character, then, block 28, the host system 11 outputs an indication of non-alterable space character which is input to input buffer 18 in formatting unit 12. Irrespective of the decision in block 25, the routine is then looped back via input 29 to decision block 24 and the above described procedure is continued with respect to the next character.

If a determination is made in decision block 24 that the next character is not a space character, then a determination is made in decision block 30 as to whether we have an end of line character. If it is determined that there is an end of line character, then, block 31, an indication will be output as an end of line control character to input buffer 18 in formatting unit 12. On the other hand if a determination is made in block 30 that the character is not an end of line character, then, block 32, the character will be output from the host system 11 to formatting unit 12 where it will be stored at the next sequential position in sequential input buffer 18.

At this point, a determination is made in decision block 33 as to whether the particular job is at an end. If it is not, the routine is looped back via input 34 to decision block 24. If it is determined that the job is at an end, then the routine is looped back via input 35 to initial step 23 in the routine.

Figure 3:
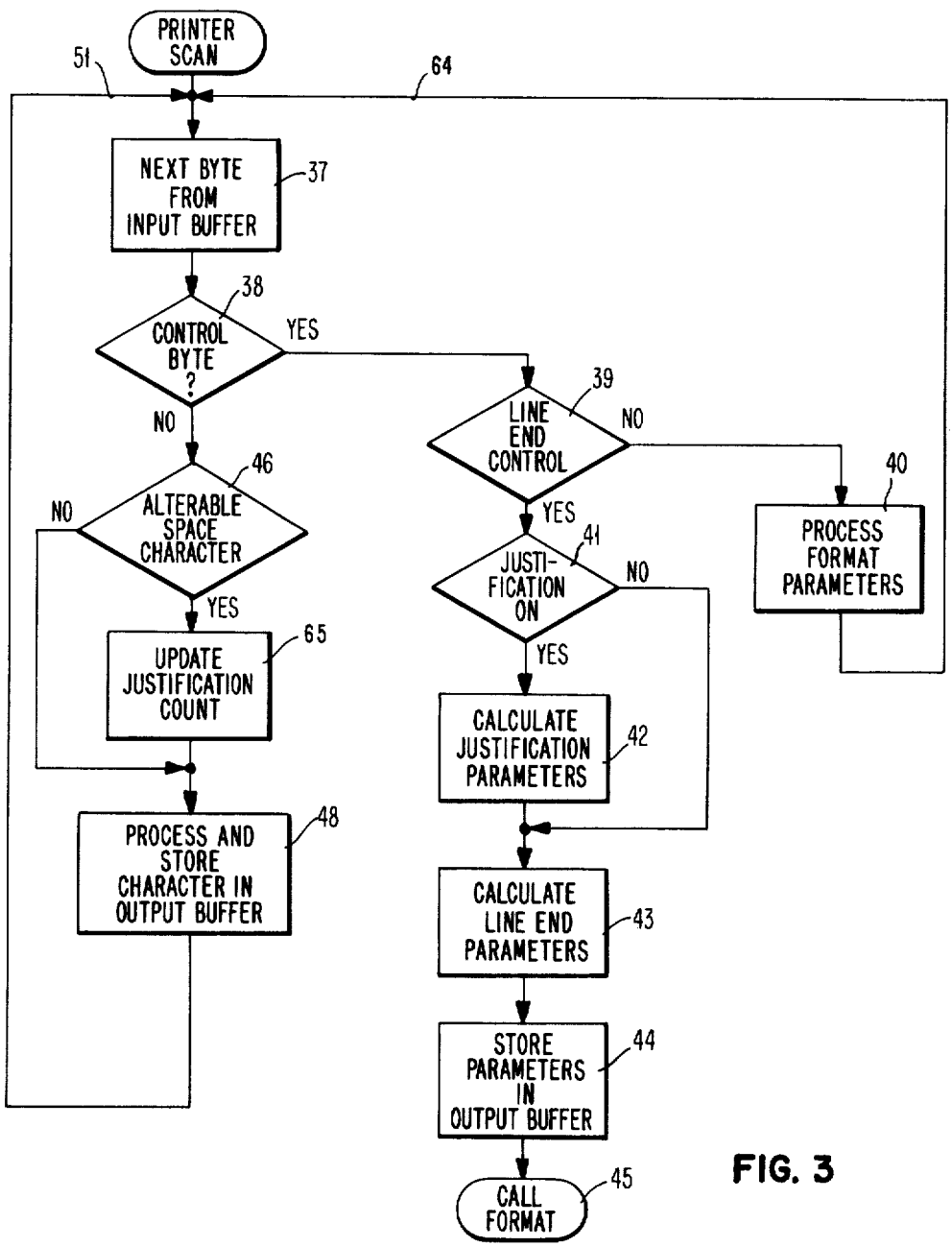
FIG. 3 is a flow chart of the process carried out in the processor system associated with the printer to determine the extent of modification of the space characters which are to be altered to effect justification.

Now with respect to FIG. 3, let us consider justification steps carried out within the processor system of formatting unit 12 associated with the printer mechanism 10 in FIG. 1. In the initial printer scan routine, characters and control codes sent by the host system 11 are verified for validity and are interpreted into commands that are recognized by the printer mechanism 10. The scan pass routine is carried out entirely within the formatting unit 12. As has been previously mentioned, commands received from the host system 11 via the communications cable or linkage 13 are stored in a recirculating input buffer 18. The formatting process commences by getting the next byte from input buffer 18 as set forth in step 37. Then, decision block 38, a determination is made as to whether this next byte is a control byte or character data byte.

Let us assume that the data turns out to be a control byte. In such a case, the following steps are taken based upon a routine stored in program memory 17 of FIG. 1 under the control of microprocessor 15. First, block 39, a determination is made as to whether or not the control byte is a line end control byte. If it is not, then, block 40, whatever format parameters are indicated by the control byte are processed and the routine is returned via input 64 to block 37 where the next byte is obtained from the input buffer 18. On the other hand, if the control byte is a line end control byte, then, a further determination is made, block 41, as to whether justification is on. In other words, if the printer were operating in an ordinary data processing mode to produce a conventional data processing printout, then, there would be no need for any significant formatting and particularly justification. In such case, the justification feature would not be on. In the present example the justification feature is on, and the routine proceeds to block 42 where the justification parameters are calculated. At this point at the end of the line the system is already aware of which spaces on the line are to be altered to effect justification. In addition, there is a count of the total number of spaces in that particular line to be altered to effect justification stored in memory 27. The determination of the count and its storage in memory 27 will be described in greater detail hereinafter.

Figure 5:
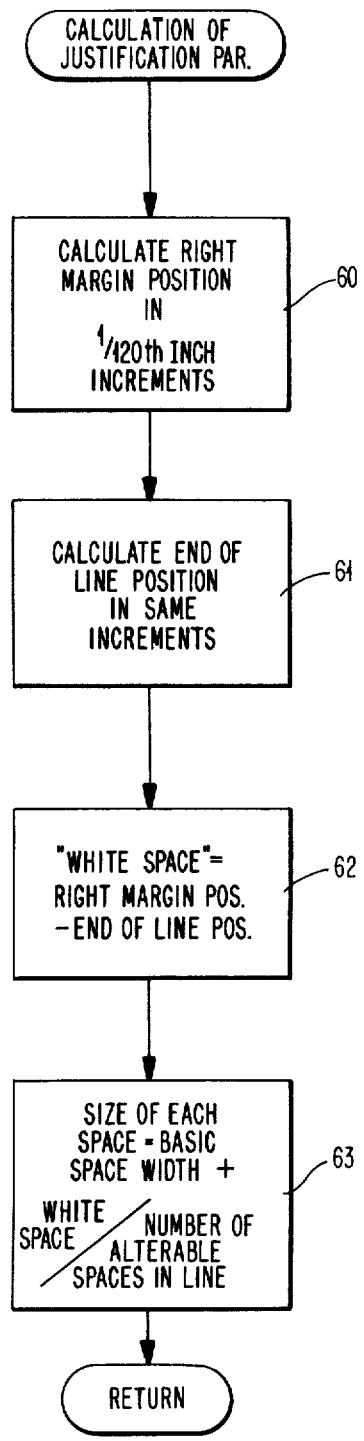
FIG. 5 is a flow chart of a routine carried out to calculate the size of the variable spaces in units which are fractions of full character widths to effect justification.

The calculation of the justification parameters as indicated above with respect to block 42 involves a sizing of each of the alterable spaces in the particular line to effect justification. While the size of the alterable spaces may be varied in units of full character width to effect such justification, a more uniform and higher quality document is produced when the system has the capability of altering the spaces by units which are a fraction of a character unit. With respect to FIG. 5, there will now be described the routine involving the calculation of justification parameters wherein positions and consequently the extent of space sizing may be determined in 1/120th inch increments. Since conventional ten pitch typing character size and consequently character space width is 12/120th of an inch each, the present incremental units involve 1/12th of a character space width. In calculating the justification parameters, first, block 60, the position of the right margin is calculated in 1/120th inch increments. Then, block 61, the position of the actual end of the line is calculated in the same increments. With these two figures, the "white space" may be calculated as indicated in block 62 by subtracting the end of line position from the right margin position. Once the white space is calculated, this space is divided by the number of alterable spaces in the line and adding the result to the basic space width as set forth in block 63, then, the size of each alterable space necessary to effect justification has been calculated in 1/120th inch increments.

After the calculation of justification parameters or if there is no justification, the routine then proceeds to block 43 where other line end parameters are calculated. These typically include print direction and distance from the end of the last line of print to the beginning of the next line.

Next, block 44, all calculated parameters associated with justification or line end are stored in output buffer 22 so that they are available when the line is ready to be printed on printer mechanism 10.

Figure 4:
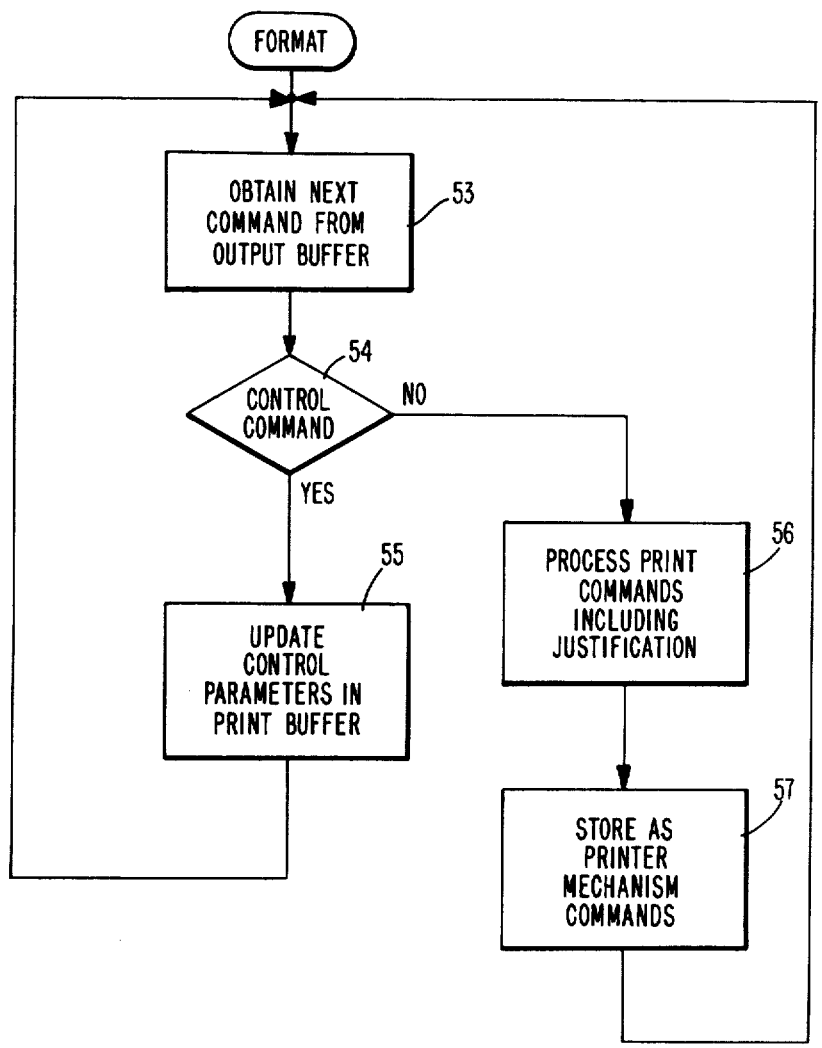
FIG. 4 is a flow chart of a process carried out in the printer processor system for providing the justification parameters determined by the processes of FIGS. 2 and 3 in the appropriate format acceptable to the printer.

At this point the format routine which will be hereinafter described in greater detail with respect to FIG. 4 is called, block 45.

Returning now to decision block 38, if a determination is made that the data obtained from the input buffer 18 is not a control byte, then, block 46, a decision is made as to whether the next character has been designated as an alterable space character. We have hereinabove described with respect to FIG. 2 how the host system 11 of FIG. 1 determines and designates the characters which are eventually stored in recirculating input buffer 18 as alterable or non-alterable space characters. At the present point, a determination is made as to whether or not the character has this designation. If the character has been so designated, then, block 65, the justification count for the particular line which is being stored in general memory 27 is updated to reflect an additional alterable space character which may be altered in order to effect justification. In any event, after this update or if the character is not an alterable space character, then the routine proceeds to block 48 wherein the particular character is processed for printing and stored in output buffer 22. The routine is then returned to block 37 via input 51 and, the next byte is obtained from recirculating input buffer 18.

Now with respect to FIG. 4, we will describe the format routine in which the bytes of data stored in output buffer 22 of formatting unit 12 are prepared for use in the printer mechanism 10. In carrying out the format routine, first block 53, the next command is obtained from output buffer 22. For purposes of this description and in the system to be described, we will be dealing with two byte command. Then, block 54, a determination is made as to whether or not the next command is a control command. By conventional control commands, we mean general commands such as direction at which the line is to be printed, the extent of alteration of spaces required for justification, pitch and underscore capability. If the command is a control command, then, the particular control parameters involved are updated in print buffer 47 so that the commands are ready to control the printer mechanism 10 when called for, block 55. If the command is not a control command, then, it must be a print command, i.e., a command associated with the actual printed character, block 56. These commands would include the amount of escapement already including justification, the extent of index and the particular characters to be printed at the particular position. These commands are then stored as direct printed mechanism commands in print buffer 47, block 57. Upon the completion of the processing of either the control command or the print command, the routine is returned to block 53 where the next command is obtained from the output buffer 22.

The information thus loaded into the print buffer 47 will be used to control the printer mechanism 10 as the printer mechanism 10 requires it in the printing operation.

While the invention has been particularly shown and described with reference to a preferred embodiment it will be understood by those skilled in the art that various other changes in form and detail may be made without departing from the spirit and scope of the invention.

We claim:

1. In a system comprising a printer controlled by a host processor, the improvement comprising,
    justification means in said processor for sequentially processing a data stream including,
        means for determining if a next unit in said data stream is a space unit,
        means for storing a list predetermining which space units are alterable, and
        means for determining from said list whether said next space unit is alterable,
    means for conveying to said printer data indicating which space units are to be altered, and
    means in said printer for determining the size of said alterable space units to effect justification.

2. The system of claim 1 wherein the size of said space units is determined in full character units.

3. The system of claim 1 wherein said host processor is primarily a data processor.

4. The system of claim 3 wherein the size of said space units is determined in units which are fractions of full character widths.

5. A method of justification in a printer controlled by a host processor comprising
    determining in said processor if a next unit in a sequential data stream is a space unit,
    storing in said processor a list predetermining which space units are alterable,
    determining from said list whether said next space unit is alterable,
    conveying to said printer data indicating which space units are to be altered, and
    determining in said printer the size of said alterable space unit to effect justification.

6. The method of claim 5 wherein the size of said space units is determined in full character units.

7. The method of claim 5 wherein said host processor is primarily a data processor.

8. The method of claim 7 wherein the size of said space units is determined in units which are fractions of full character widths.

* * * * *